E. LEONARD.
Harness-Saddle Trees.

No. 155,616. Patented Oct. 6, 1874.

WITNESSES:
Geo. H. Graham
J. W. Graham

INVENTOR:
Ezra Leonard
By Daniel Breed
Atty.

THE GRAPHIC CO. PHOTO-LITH. 39 & 41 PARK PLACE, N.Y.

UNITED STATES PATENT OFFICE

EZRA LEONARD, OF AKRON, OHIO.

IMPROVEMENT IN HARNESS-SADDLE TREES.

Specification forming part of Letters Patent No. 155,616, dated October 6, 1874; application filed September 9, 1874.

*To all whom it may concern:*

Figure 1:
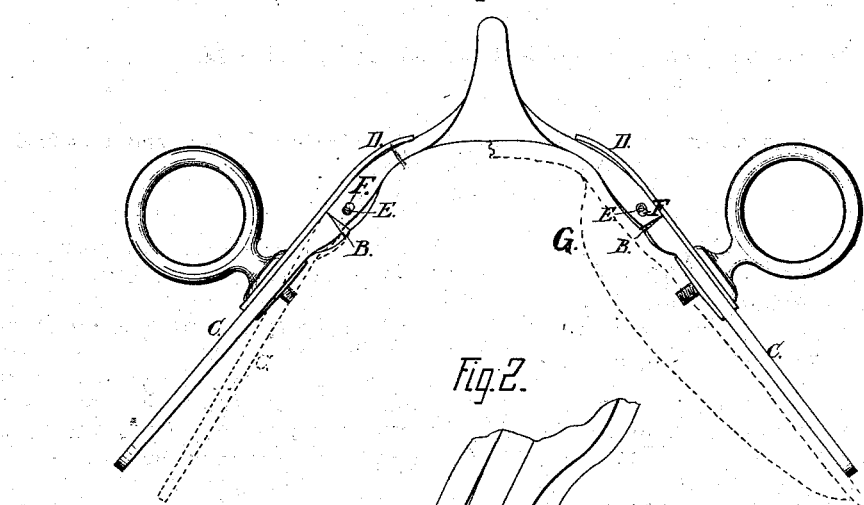
Figure 2:
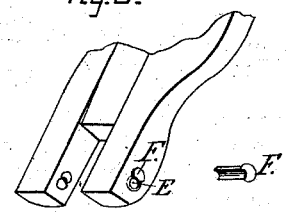
Figure 4:
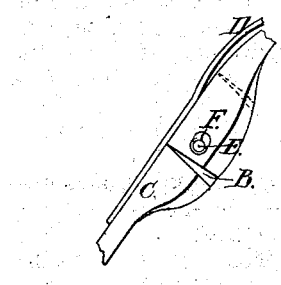
Figure 3:
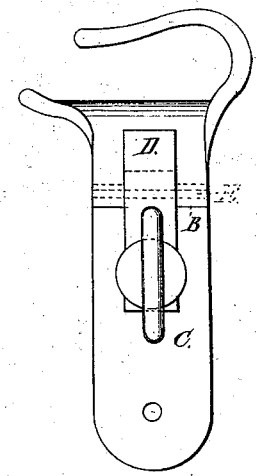
Figure 5:
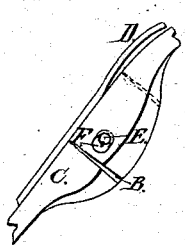

Be it known that I, EZRA LEONARD, of Akron, in the county of Summit and State of Ohio, have invented an Improvement in Saddle-Trees, of which the following is a specification:

In the accompanying drawings, Figure 1 is a front view of my improved saddle-tree. Fig. 3 is a side view of the same. Figs. 2, 4, and 5 are detached views of parts.

My invention consists, first, in a saddle-tree provided with hinges that rigidly lock when weight is put upon the saddle, thus relieving the backbone of the horse from all pressure or weight; secondly, in an adjustable joint or hinge, for the purpose of fitting the same saddle-tree to different-sized horses; and, thirdly, of springs in combination with the hinges of a saddle-tree.

In constructing my saddle-tree I propose to make the check-hook A very low, and also allow the back plate of the tree to come close down to the horse's back, so that the check-rein will not tilt the saddle forward. Therefore I do not pad the tree at the middle, but simply cover it with leather as a finish. The hinges of my saddle-tree are intended to have very little motion, and they are, therefore, made with sharp corners, as seen at B, Fig. 1. By this construction the weight upon the saddle, as in case of a cart or heavy wagon shafts, is thrown upon the wings C of the saddle-tree beyond the hinges B, Fig. 1, which lock by means of the weight. A spring, D, is placed above the hinge, in order to give an elastic bearing upon the horse, and also give elasticity to the hinge itself, and thus make a very desirable saddle, which will rarely if ever chafe the horse.

Now, with this saddle-tree, it is very important to nearly fit the horse in order to gain the full advantage of my improvement. Therefore, it is sometimes desirable to adjust the wings of the saddle-tree either inward or outward, so that the hinges B will lock at the right point. To accomplish this purpose I make a slot for the pin or pivot E, and use an adjusting-strip, F, to help close the slot. By placing the adjusting-strip below the pivot the wing of the tree goes up home, as in Fig. 1. But by placing the pivot in the lower part of the slot, and the adjusting-strip above it, as seen in Fig. 4, the wings can expand to a greater width before the hinges lock, and thus the saddle will fit a larger horse.

In padding my saddle-tree I propose to make a prominent shoulder at the upper part, as shown at G, Fig. 1.

It may be mentioned that a saddle-tree intended for a smaller horse may have the corners of the hinge B filed away, so that the wings of the tree will expand, and thus fit a larger horse.

Having thus described my invention, I claim—

1. In a saddle-tree, the wings C C, attached to the bridge by hinges, shouldered at B, as and for the purposes described.

2. The springs D, in combination with the hinges B, substantially as set forth.

3. The adjustable hinges B, provided with the adjusting-strip F, substantially as set forth.

EZRA LEONARD.

Witnesses:
CHAS. REINHART,
R. H. KNIGHT.